US012546446B2

(12) United States Patent
Ruan

(10) Patent No.: US 12,546,446 B2
(45) Date of Patent: Feb. 10, 2026

(54) CANDLE LAMP

(71) Applicant: Xin Ruan, Shenzhen (CN)

(72) Inventor: Xin Ruan, Shenzhen (CN)

( * ) Notice: Subject to any disclaimer, the term of this patent is extended or adjusted under 35 U.S.C. 154(b) by 0 days.

(21) Appl. No.: 19/288,916

(22) Filed: Aug. 1, 2025

(65) Prior Publication Data

US 2025/0354668 A1 Nov. 20, 2025

Related U.S. Application Data

(63) Continuation-in-part of application No. PCT/CN2024/070078, filed on Jan. 2, 2024.

(30) Foreign Application Priority Data

Dec. 14, 2023 (CN) ........................ 202323419939.5
Dec. 14, 2023 (CN) ........................ 202323422900.9

(51) Int. Cl.

| | |
|---|---|
| ***F21S 6/00*** | (2006.01) |
| ***F21S 10/04*** | (2006.01) |
| ***F21V 15/01*** | (2006.01) |
| ***F21V 17/10*** | (2006.01) |
| ***F21V 17/16*** | (2006.01) |
| ***F21V 17/18*** | (2006.01) |
| ***F21V 23/00*** | (2015.01) |
| ***F21V 23/04*** | (2006.01) |

(Continued)

(52) U.S. Cl.
CPC ............... *F21S 6/001* (2013.01); *F21S 10/04* (2013.01); *F21V 15/01* (2013.01); *F21V 17/104* (2013.01); *F21V 17/164* (2013.01); *F21V 17/18* (2013.01); *F21V 23/003* (2013.01); *F21V 23/004* (2013.01); *F21V 23/006* (2013.01); *F21V 23/04* (2013.01); *F21V 23/06* (2013.01); *F21W 2121/00* (2013.01)

(58) Field of Classification Search
CPC ......... F21S 6/001; F21S 10/04; F21V 23/004; F21V 17/164; F21V 17/18; F21V 17/12
See application file for complete search history.

(56) References Cited

U.S. PATENT DOCUMENTS 11,719,401 B1 * 8/2023 Chen ....................... F21S 6/001 362/294
2008/0036332 A1 * 2/2008 Helf .......................... A61L 9/14 310/311

(Continued)

FOREIGN PATENT DOCUMENTS

CN 204665154 U 9/2015
CN 107606547 A 1/2018

(Continued)

*Primary Examiner* — William N Harris
(74) *Attorney, Agent, or Firm* — Birchwood IP

(57) ABSTRACT

The present disclosure provides a candle lamp (10). The candle lamp (10) comprises a lamp body (100), a wick (200), a base (310), and a power driver board (320). The wick (200) and the base (310) are disposed at opposite ends of the lamp body (100) along a longitudinal direction thereof. The power driver board (320), together with the base (310), is secured to a bottom portion of the lamp body (100). This configuration of the candle lamp (10) provides a stable connection, preventing unintended detachment of the base (310) and the power driver board (320) from the lamp body (100).

18 Claims, 7 Drawing Sheets

(51) Int. Cl.
*F21V 23/06* (2006.01)
*F21W 121/00* (2006.01)

(56) References Cited

U.S. PATENT DOCUMENTS

| | | | | |
|---|---|---|---|---|
| 2008/0117633 | A1* | 5/2008 | Li | F21S 6/001<br>84/602 |
| 2018/0003352 | A1* | 1/2018 | Cao | F21V 23/02 |
| 2022/0412525 | A1* | 12/2022 | DeCosmo | F21S 10/043 |

FOREIGN PATENT DOCUMENTS

| | | | | |
|---|---|---|---|---|
| CN | 207906868 | U | 9/2018 | |
| CN | 110500552 | A | 11/2019 | |
| CN | 111928198 | A | 11/2020 | |
| CN | 212673063 | U | 3/2021 | |
| CN | 215929282 | U | 3/2022 | |
| CN | 219283144 | U | 6/2023 | |
| WO | WO-2017181220 | A1 * | 10/2017 | A61G 17/08 |
| WO | 2023277784 | A1 | 1/2023 | |

* cited by examiner

CANDLE LAMP

CROSS-REFERENCE TO RELATED APPLICATIONS

This application is a continuation of PCT/CN2024/070078, filed on Jan. 2, 2024, and claims priority of Chinese Patent Application No. 202323422900.9, filed on Dec. 14, 2023, and claims priority of Chinese Patent Application No. 202323419939.5, filed on Dec. 14, 2023, the entire contents of which are incorporated herein by reference.

TECHNICAL FIELD

The present disclosure relates to the field of lighting apparatus, and more particularly, to a candle lamp.

BACKGROUND

With the continuous development of society and the improvement of people's living standards, traditional candles are no longer a mainstream lighting tool due to the smoke and carcinogens they produce. They have gradually been replaced by candle lamps with similar appearances. Candle lamps can create an ambient atmosphere while ensuring user safety. In existing candle lamps, a base may be provided with a protruding post, and a lamp body may be provided with a corresponding recess to match the post. The post is engaged in the recess, and an adhesive is used to assist in fixing the base and the lamp body. However, after a period of use, the post may fracture or the adhesive may detach, leading to an unstable connection and affecting the operational lifespan of the candle lamp.

SUMMARY

The present disclosure aims to provide a candle lamp that addresses the problems of potential fracture of the protruding post or detachment of adhesive in existing candle lamps, which can result in an unstable connection and negatively impact the operational lifespan.

To address the aforementioned technical problems, the present disclosure provides the following technical solutions:

In a first aspect, the present disclosure provides a candle lamp, comprising:

a lamp body;

a wick, disposed at a first end of the lamp body along a longitudinal direction thereof, the wick being configured to emit light;

a base, disposed at a second end of the lamp body opposite the wick, the base being engaged with the lamp body to define a receiving cavity therebetween, the base having a first through-hole; and a power driver board, disposed within the receiving cavity and electrically coupled to the wick, the power driver board being electrically coupled to a charging port, wherein the charging port is aligned with the first through-hole for connecting with an external power source;

wherein a groove is formed on one of a wall of the receiving cavity and the base, and a corresponding latching tab is formed on the other of the wall of the receiving cavity and the base, the latching tab engaging the groove to longitudinally secure the base to the lamp body.

In a second aspect, the present disclosure also provides a candle lamp, comprising:

a lamp body;

a wick, disposed at a first end of the lamp body along a longitudinal direction thereof, the wick being configured to emit light; and a base assembly, comprising a base and a power driver board, the power driver board being fixedly connected to the base, and the power driver board being further electrically coupled to the wick; wherein the power driver board is configured to move synchronously with the base to engage the base assembly with a second end of the lamp body, thereby positioning the power driver board within a receiving cavity defined by the base and the lamp body.

In a third aspect, the present disclosure also provides a candle lamp, comprising:

a lamp body;

a wick, disposed at a first end of the lamp body along a longitudinal direction thereof, the wick being configured to emit light; and a base assembly, comprising a base, a power driver board, and a screw-threaded connector, the screw-threaded connector passing through the base and being threadedly connected to the power driver board to fix the base to the power driver board; and the power driver board being further electrically coupled to the wick; wherein the power driver board is configured to move synchronously with the base to engage the base assembly with a second end of the lamp body, thereby positioning the power driver board within a receiving cavity defined by the base and the lamp body.

The embodiments of the present disclosure provide at least the following advantages and positive effects:

In the candle lamp of the present disclosure, a groove is formed on one of a wall of the receiving cavity and the base, and a corresponding latching tab is formed on the other of the wall of the receiving cavity and the base. The latching tab engages the groove to longitudinally secure the base to the lamp body. This configuration ensures a stable connection, prevents unintended detachment of the base from the lamp body, and effectively extends the operational lifespan of the candle lamp.

BRIEF DESCRIPTION OF DRAWINGS

In order to illustrate the technical solutions of the embodiments of the present disclosure or of the prior art more clearly, the following drawings are briefly described as required in the context of the embodiments or the prior art. Obviously, the following drawings illustrate only some of the embodiments of the present disclosure. Other relevant drawings may be obtained on the basis of the shown structures of these drawings without any creative effort by those skilled in the art.

DESCRIPTION OF REFERENCE NUMERALS

Figure 1:
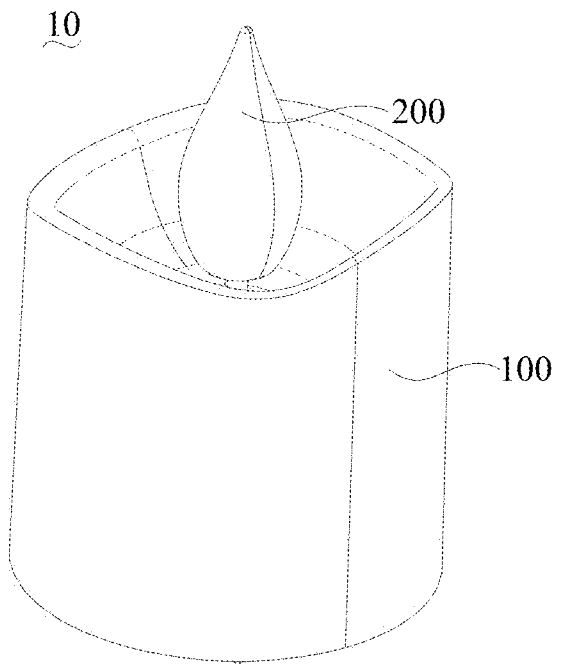
FIG. 1 is a perspective view of a candle lamp in accordance with a first embodiment of the present disclosure.

10: Candle lamp
100: Lamp body
110: Receiving cavity
120: Groove
130: Tapered groove
131: First end
132: Second end
200: Wick
300: Base assembly
310: Base
311: Latching tab
312: First through-hole
313: Second through-hole
314: Latching hook
315: Guide groove
316: First surface
320: Power driver board
321: Charging port
322: Latching slot
323: Second surface
400: Control assembly
410: Control main body
420: Switch.

DESCRIPTION OF EMBODIMENTS

Typical embodiments reflecting features and advantages of the present disclosure will be described in detail in the following description. It should be understood that the present disclosure may admit to various modifications in different embodiments without departing from the scope of the present disclosure. The descriptions and drawings therein are substantially illustrative in nature rather than restrictive of the present disclosure.

Furthermore, the related terms "first", and "second" are used for descriptive purposes only and are not to be understood as indicating or implying relative importance or implicitly specifying the number of technical features indicated. Thus, features defined as "first" or "second" may explicitly or implicitly include one or more of such features. In the description of the present application, the term "a plurality of" means two or more unless otherwise expressly specified.

In the description of the present application, it should be noted that terms such as "installed," "provided," and "connected" should be broadly understood unless otherwise expressly defined and limited. For example, a connection may be a fixed connection, a detachable connection, or an integral connection; may be a mechanical connection or an electrical connection; may be a direct connection or an indirect connection through an intermediate medium; and may be communication between interiors of two components. Those of ordinary skill in the art may understand the specific meanings of the above terms in the present disclosure based on practical contexts.

First, referring to FIG. 1, the present disclosure provides a candle lamp 10. The appearance of the candle lamp 10 is similar to a traditional candle that is lit by igniting a wick, and both can be used for illumination and decoration. Unlike a candle lit by igniting a wick, the candle lamp 10 does not produce smoke or carcinogens, making it more environmentally friendly. The candle lamp 10 can create an ambient atmosphere while ensuring user safety.

Figure 2:
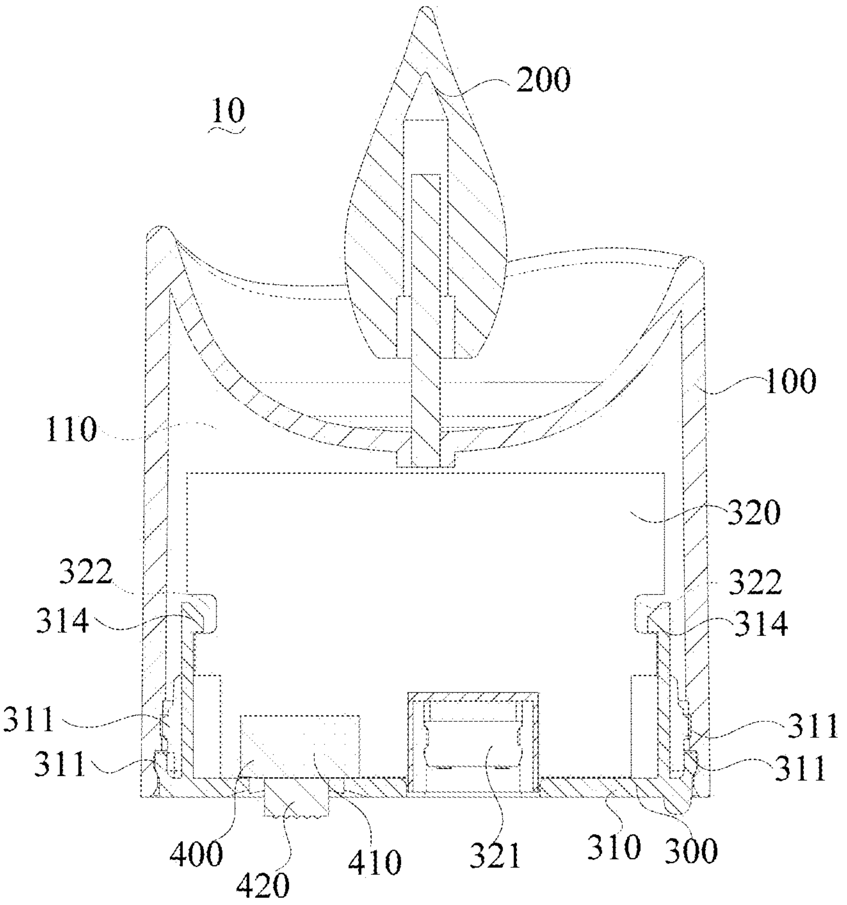
FIG. 2 is a cross-sectional view of the candle lamp shown in FIG. 1.
Figure 3:
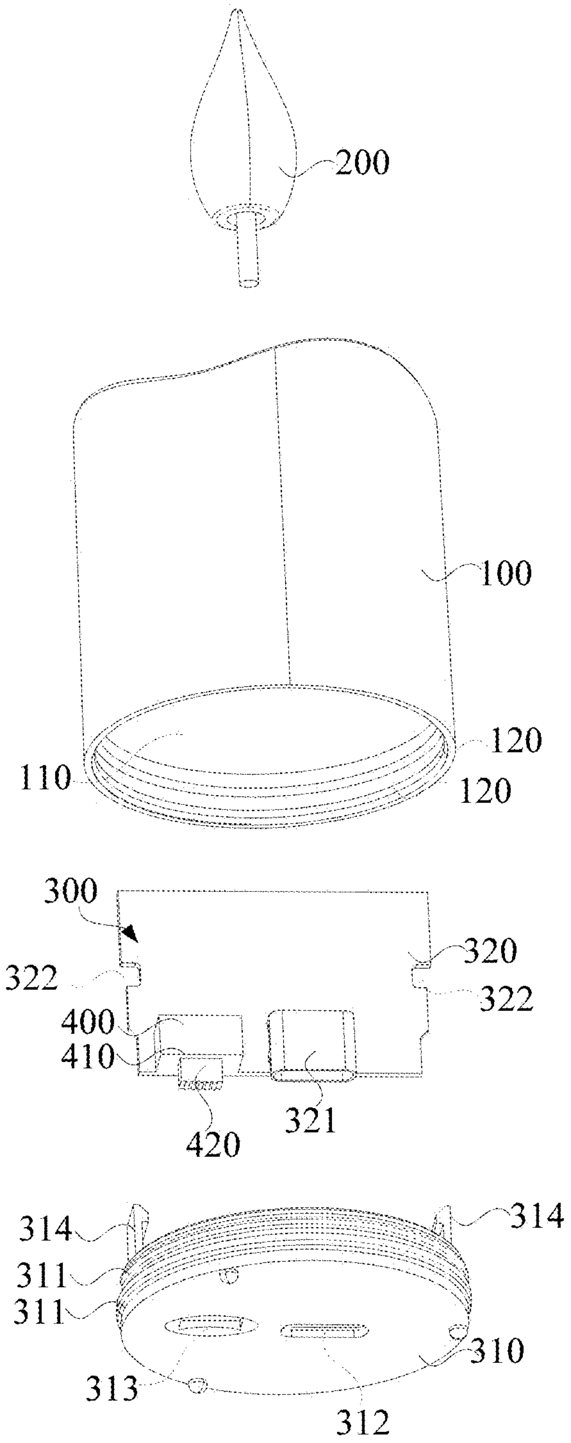
FIG. 3 is an exploded perspective view of the candle lamp shown in FIG. 1.

Referring to FIGS. 2 and 3, the candle lamp 10 comprises a lamp body 100, a wick 200, and a base assembly 300. The wick 200 and the base assembly 300 are disposed at opposite ends of the lamp body 100 along its longitudinal direction. The wick 200 is used for emitting light, and the base assembly 300 is used for connecting to an external power source to supply power to the wick 200, causing the wick 200 to emit light when supplied with electrical power, thereby providing illumination.

Figure 4:
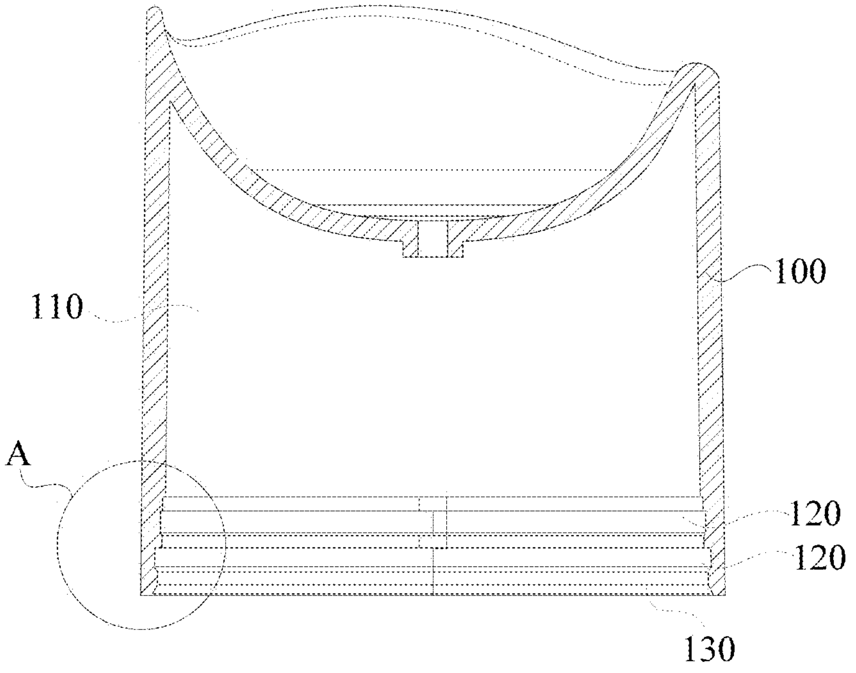
FIG. 4 is a structural view of the lamp body of the candle lamp shown in FIG. 2.

FIG. 4 illustrates that the lamp body 100 is cylindrical, and its shape is similar to that of a candle. It is understood that in other embodiments, the shape of the lamp body 100 can also be a cuboid, a rectangular prism, an ellipsoid, etc.

Continuing to refer to FIGS. 2 and 3, the lamp body 100 is provided with a receiving cavity 110 and a groove 120. The receiving cavity 110 is used to accommodate the aforementioned base assembly 300 to achieve a fixed connection between the base assembly 300 and the lamp body 100. The groove 120 is located on a wall of the receiving cavity 110, and the base assembly 300 is configured to engage with the groove 120 to prevent the base assembly 300 from detaching from the receiving cavity 110.

It should be noted that the groove 120 extends circumferentially along the lamp body 100 in the form of a ring, and this circumferential direction is perpendicular to the longitudinal direction of the lamp body 100. In this case, the groove 120 can be a circumferentially continuous annular structure, or a circumferentially discontinuous and spaced annular structure, or a circumferentially continuous arc-shaped structure.

It should also be noted that the number of grooves 120 may be multiple. The multiple grooves 120 are spaced apart along the longitudinal direction of the lamp body 100. The provision of multiple grooves 120 allows for a more secure engagement between the base assembly 300 and the lamp body 100, thereby preventing the base assembly 300 from detaching from the receiving cavity 110. It is understood that in other embodiments, the number of grooves 120 can also be singular. The number of grooves 120 can be set according to practical needs, and the present disclosure does not specifically limit the number of grooves 120. Furthermore, when the number of grooves 120 is multiple, for any two adjacent grooves 120 along the longitudinal direction of the lamp body 100, a radial dimension of the groove 120 closer to the wick 200 is smaller than a radial dimension of the groove 120 farther from the wick 200.

Figure 5:
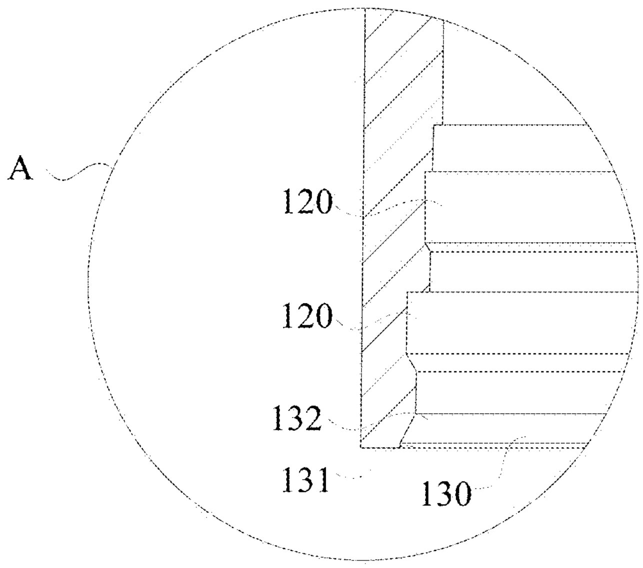
FIG. 5 is a partial enlarged view of region A of the lamp body shown in FIG. 4.

Referring to FIGS. 4 and 5, the lamp body 100 is provided with a tapered groove 130. The tapered groove 130 is located on a side of the groove 120 farther from the wick 200 and is spaced apart from the groove 120. The tapered groove 130 has a first end 131 and a second end 132 opposite each other along the longitudinal direction of the lamp body 100. The second end 132 is closer to the groove 120, and a radial dimension of the first end 131 is greater than a radial dimension of the second end 132. The tapered groove 130 extends circumferentially and continuously along the lamp body 100.

Continuing to refer to FIGS. 2 and 3, the base assembly 300 comprises a base 310 and a power driver board 320. The base 310 closes the receiving cavity 110 of the lamp body 100 and engages with the groove 120 to prevent the base 310 from detaching from the lamp body 100 in the longitudinal direction, thereby fixing the base 310 to the lamp body 100. The power driver board 320 is fixedly connected to the base 310 and is disposed within the receiving cavity 110. The power driver board 320 is electrically coupled to the wick 200, enabling an external power source to supply power to the wick 200 through the power driver board 320. When supplied with electrical power, the wick 200 emits light to achieve illumination. It is understood that the power driver board 320 and the base 310 may not be fixedly connected. The connection method between the power driver board 320 and the base 310 can also be a screw-threaded connection, an adhesive connection, or a detachable connection, for example, the power driver board 320 can be magnetically attached to the base 310. Any solution where the power driver board 320 can be accommodated within the receiving cavity 110 should be protected.

In this embodiment, the base 310 is provided with a latching tab 311 and engages with the lamp body 100 by inserting the latching tab 311 into the groove 120, thereby longitudinally securing the base 310 to the lamp body 100. The latching tab 311 is circumferentially discontinuous along the lamp body 100, being divided into a plurality of circumferentially spaced, arc-shaped latching segments. The arc-shaped latching segments deform toward an inner side of the base 310 in response to radial pressure during engagement with the groove 120. By providing the latching tab 311 as circumferentially discontinuous, the space between the segments of the latching tab 311 provides room for movement for the elastic deformation of the latching tab 311, thereby increasing the elastic force of the deformation and facilitating easier engagement between the base 310 and the lamp body 100. It is understood that the latching tab 311 can also be circumferentially continuous, and any solution where the latching tab 311 can engage with the groove 120 should be protected. It is also understood that the latching tab 311 can extend circumferentially along the lamp body 100 in the form of a ring. In this case, the latching tab 311 can be a circumferentially continuous annular structure, or a circumferentially discontinuous and spaced annular structure, or a circumferentially continuous arc-shaped structure.

It should be noted that in other embodiments, the placement of the groove 120 and the latching tab 311 can be reversed. In such a case, the groove 120 is provided on the base 310, and the latching tab 311 is provided on the wall of the receiving cavity 110. Therefore, the present disclosure does not limit the specific placement of the groove 120 and the latching tab 311.

Specifically, when the base 310 carrying the power driver board 320 closes the receiving cavity 110, the base 310 carries the latching tab 311 to move along a wall of the tapered groove 130, guiding the base 310 to slide into the receiving cavity 110. The tapered groove 130 being circumferentially continuous allows the latching tab 311 to engage with the receiving cavity 110 from any orientation when aligning with the tapered groove 130.

It should be noted that in other embodiments, the groove 120 and the latching tab 311 may be omitted. In this case, the connection method between the base 310 and the lamp body 100 may not be a latching connection. The connection can be achieved by other means, for example, the base 310 and the lamp body 100 can be fixed by a screw-threaded connection, or the base 310 can be press-fitted into the receiving cavity 110 to form an interference fit with the lamp body 100.

Referring to FIGS. 2 and 3, the number of latching tabs 311 is multiple. The multiple latching tabs 311 are spaced apart along the longitudinal direction and correspond one-to-one with the multiple grooves 120. By providing multiple latching tabs 311 that cooperate with multiple grooves 120, the abutting force between the base 310 and the lamp body 100 is increased, making the engagement more secure. It is understood that, if a more secure engagement is not considered, the number of latching tabs 311 need not be multiple, and any solution where the base 310 can be fixed to the lamp body 100 should be protected.

Referring to FIG. 2, it should be noted that when the number of latching tabs 311 is multiple, for any two adjacent latching tabs 311 along the longitudinal direction of the lamp body 100, a radial dimension of the latching tab 311 closer to the wick 200 is smaller than a radial dimension of the latching tab 311 farther from the wick 200. By setting the radial dimension of the latching tab 311 closer to the wick 200 to be smaller than that of the one farther away, during the process of engaging the base 310 with the lamp body 100, the latching tab 311 closer to the wick 200 will not engage with the groove 120 farther from the wick 200, facilitating convenient installation and a compact structure.

It should be noted that for a corresponding pair of the latching tab 311 and the groove 120, at least one of their mutually contacting surfaces during engagement is a sloped surface or a curved surface. For example, as shown in FIG. 2, both contacting surfaces of the latching tab 311 and the groove 120 are sloped. The surface of the latching tab 311 can move along the surface of the groove 120, thereby effecting their mutual engagement. It should be noted that in other embodiments, the surface of the latching tab 311 can be a sloped or curved surface, while the surface of the groove 120 is a plane parallel to the longitudinal direction of the lamp body 100. Alternatively, in other embodiments, the surface of the latching tab 311 can also be a plane parallel to the longitudinal direction of the lamp body 100, while the surface of the groove 120 is a sloped or curved surface. Therefore, the present disclosure does not limit the specific configuration of the contacting surfaces of the latching tab 311 and the groove 120 during engagement.

The latching tab 311 is elastically deformable, such that when the base 310 closes the receiving cavity 110, the latching tab 311 can be compressed and deformed between the lamp body 100 and the base 310, allowing the base 310 to carry the latching tab 311 to move relative to the lamp body 100 and engage with the groove 120. By making the latching tab 311 elastically deformable, it can abut against the lamp body 100 and be compressed. When closing the base 310 onto the lamp body 100, the latching tab 311 easily engages with the groove 120. It is understood that in alternative embodiments where ease of engagement is not a primary design consideration, the latching tab 311 can also be configured to be non-elastically deformable, and any solution where the base 310 can close the receiving cavity 110 should be protected. It is also understood that in other embodiments, the latching tab 311 may not be elastically deformable.

Figure 6:
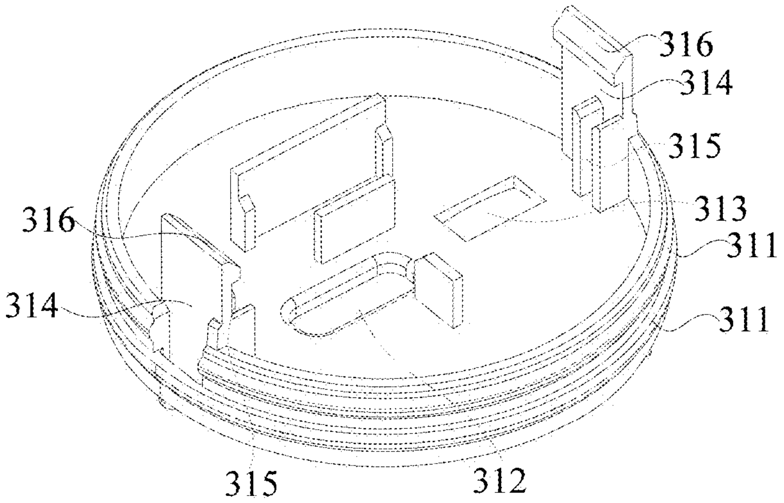
FIG. 6 is a structural view of the base of the candle lamp shown in FIG. 2.

Referring to FIGS. 3 and 6, the base 310 is provided with a first through-hole 312 and a second through-hole 313. Both the first through-hole 312 and the second through-hole 313 extend along the longitudinal direction of the lamp body 100. The second through-hole 313 is spaced apart from the first through-hole 312. Both the first through-hole 312 and the second through-hole 313 connect the receiving cavity 110 to the exterior of the candle lamp 10.

Referring to FIGS. 2 and 6, the base 310 is provided with a latching hook 314. The latching hook 314 extends along the longitudinal direction of the lamp body 100 and engages with the power driver board 320. The number of latching hooks 314 is at least two, and the two latching hooks 314 are disposed diametrically opposite each other on the base 310. By providing at least two latching hooks 314 that are diametrically opposite, the forces acting on the power driver board 320 are balanced, and the connection between the power driver board 320 and the base 310 is more secure. It is understood that the number of latching hooks 314 can be multiple, or their specific quantity can be set according to practical needs. Therefore, the present disclosure does not limit the specific number of latching hooks 314.

It should be noted that the latching hook 314 is elastically deformable, such that when detaching the power driver board 320 from the base 310, the latching hook 314 can elastically deform away from a side where the power driver board 320 is located, allowing the latching hook 314 to disengage from the power driver board 320, thereby enabling detachment. By making the latching hook 314 elastically deformable, it is more convenient for a user to replace the power driver board 320 or the base 310, thereby facilitating the detachment process. It is understood that if the convenience of detaching the power driver board 320 from the base 310 is not a consideration, the latching hook 314 can also be configured to be non-elastically deformable, and any solution where the power driver board 320 can be detached from the base 310 should be protected.

Referring to FIG. 6, the base 310 is provided with a guide groove 315. The guide groove 315 extends along the longitudinal direction of the lamp body 100. The number of guide grooves 315 is two, and a side edge of the power driver board 320 is simultaneously disposed within the two guide grooves 315, thereby circumferentially constraining the power driver board 320 within the guide grooves 315.

Figure 7:
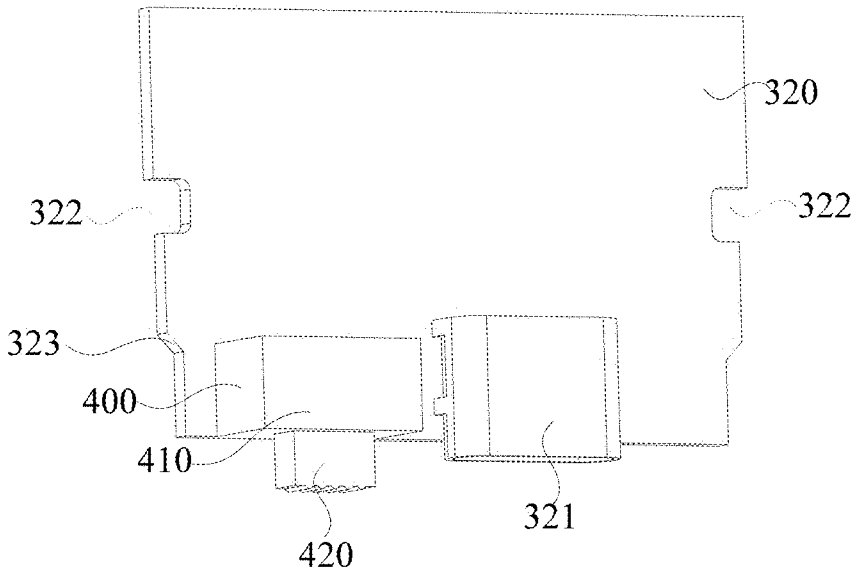
FIG. 7 is a structural view of the power driver board of the candle lamp shown in FIG. 2.

Referring to FIGS. 3 and 7, the power driver board 320 is electrically coupled to a charging port 321. The charging port 321 is electrically connected to the power driver board 320. The charging port 321 is aligned with the first through-hole 312 for connecting with an external power source, enabling the external power source to supply power to the wick 200 through the power driver board 320. During the process of fixing the power driver board 320 to the base 310, the charging port 321 aligns with the first through-hole 312, and a portion of the charging port 321 structure is accommodated within the first through-hole 312.

It should be noted that the base 310 is capable of rotating synchronously with the latching tab 311, allowing the latching tab 311 to rotate relative to the lamp body 100 within the groove 120 along its circumferential direction. By rotating the base 310, the orientation of the first through-hole 312 can be changed, allowing the user to change the direction of the power cord according to practical usage needs, which is convenient and improves the user experience. It is understood that if changing the direction of the power cord is not a consideration, the latching tab 311 can also be configured to be non-rotatable relative to the lamp body 100 within the groove 120, and any solution where the power cord can be plugged into the charging port 321 should be protected.

In summary, in the present disclosure, by providing a groove 120 on one of a wall of the receiving cavity 110 and the base 310, and a latching tab 311 on the other, the latching tab 311 engages with the groove 120, longitudinally securing the base 310 to the lamp body 100. The unintended detachment of the base 310 from the lamp body 100 is prevented, the connection is stable, and the operational lifespan of the candle lamp 10 is effectively extended.

Referring to FIGS. 2 and 7, the power driver board 320 is provided with a latching slot 322. The latching slot 322 is formed on an edge of the power driver board 320. The latching hook 314 engages with and is fixed to the latching slot 322. By providing the latching slot 322, the latching hook 314 can engage with it, thereby constraining the movement of the power driver board 320 relative to the base 310. It is understood that in other embodiments, the latching hook 314 and the latching slot 322 may be omitted. In this case, the power driver board 320 can be directly adhered and fixed to the base 310, or it can be connected and fixed to the base 310 by a screw, or it can be fixed by magnetic attraction, for example, by providing magnets on both the base 310 and the power driver board 320. Any solution where the power driver board 320 can be fixedly connected to the base 310 should be protected.

Referring to FIG. 2, the power driver board 320 extends vertically along the longitudinal direction of the lamp body 100. The thickness direction of the power driver board 320 is perpendicular to the longitudinal direction of the lamp body 100. By setting the power driver board 320 to extend vertically along the longitudinal direction of the lamp body 100, a gap is left between the two side walls of the power driver board 320 and the wall of the receiving cavity 110, allowing for faster dissipation of heat generated by the power driver board 320. It is understood that if the heat dissipation rate is not a consideration, the power driver board 320 can also be set to extend radially along the lamp body 100, and any solution where the power driver board 320 can be fixed to the base 310 should be protected.

The number of latching slots 322 is at least two and corresponds one-to-one with the latching hooks 314. The two latching slots 322 are disposed on opposite ends of the power driver board 320, and the direction of opposition of the two latching slots 322 is perpendicular to both the longitudinal direction of the lamp body 100 and the thickness direction of the power driver board 320.

Referring to FIG. 6, the two guide grooves 315 are disposed along the direction of opposition of the two latching slots 322. During the process of fixing the power driver board 320 to the base 310, a side edge of the power driver board 320 can slide along the guide groove 315 vertically toward the base 310, to align the latching hook 314 with the latching slot 322, thereby allowing the latching hook 314 to be inserted into the latching slot 322.

Referring to FIGS. 6 and 7, the latching hook 314 is provided with a first surface 316, and the power driver board 320 is provided with a second surface 323. At least one of the first surface 316 and the second surface 323 is a sloped surface, and a normal vector of the sloped surface is inclined with respect to the longitudinal direction of the lamp body 100. For example, as shown in FIGS. 6 and 7, both the first surface 316 and the second surface 323 are sloped. During the process of fixing the power driver board 320 to the base 310, the second surface 323 can move along the first surface 316, allowing the power driver board 320 to move relative to the base 310, thereby effecting the engagement of the latching hook 314 and the latching slot 322. It should be noted that in other embodiments, the first surface 316 can be a sloped or curved surface, while the second surface 323 is a plane parallel to the longitudinal direction of the lamp body 100. Alternatively, in other embodiments, the first surface 316 can also be a plane parallel to the longitudinal direction of the lamp body 100, while the second surface 323 is a sloped or curved surface. Therefore, the present disclosure does not limit the specific configuration of the first surface 316 and the second surface 323.

Referring to FIGS. 2 and 3, the candle lamp 10 further comprises a control assembly 400. The control assembly 400 comprises a control main body 410 and a switch 420. The control main body 410 is disposed within the receiving cavity 110 and is connected to the power driver board 320. The switch 420 is connected to the control main body 410 and is movable relative thereto to switch between an ON state and an OFF state. In the ON state, the power driver board 320 is electrically connected to the wick 200, and the wick 200 is in a light-emitting state. In the OFF state, the power driver board 320 is disconnected from the wick 200, and the wick 200 is in a de-energized state. By providing the control assembly 400, the lighting or extinguishing of the wick 200 can be controlled. A user can slide the switch 420 according to usage needs to switch the wick 200 between the light-emitting and de-energized states, which is convenient to operate and can instantly meet the user's needs. If the candle lamp 10 is not provided with the control assembly 400, when a user wants to turn on the candle lamp 10, it needs to be charged to make the wick 200 light up. When the user wants to turn it off, the power within the candle lamp 10 needs to be completely consumed to turn off the wick 200, which consumes time and cannot instantly meet the user's needs, making the operation inconvenient. It is understood that if user experience is not a consideration, the control assembly 400 may not be provided, and any solution where the wick 200 can be switched between the light-emitting and de-energized states should be protected.

It should be noted that in other embodiments, the control main body 410 may be omitted. In this case, retaining the switch 420 is sufficient to control the lighting or extinguishing of the wick 200, with the switch 420 being electrically connected to the power driver board 320.

Specifically, the switch 420 passes through the second through-hole 313, such that a portion of the switch 420 structure is exposed outside the receiving cavity 110 for manual operation. During the process of fixing the power driver board 320 to the base 310, the switch 420 aligns with the second through-hole 313.

Although the present disclosure has been described with reference to several typical embodiments, it should be understood that the terminology used is illustrative and exemplary rather than restrictive. Since the present disclosure can be implemented in various forms without departing from its spirit or essence, it should be understood that the above-described embodiments are not limited by any foregoing details but should be broadly interpreted within the spirit and scope defined by the appended claims. Therefore, all changes and modifications falling within the scope of the claims or equivalents thereof should be covered by the appended claims.

What is claimed is:

1. A candle lamp, comprising:

a lamp body;

a wick, disposed at a first end of the lamp body along a longitudinal direction thereof, the wick being configured to emit light;

a base, disposed at a second end of the lamp body along the longitudinal direction thereof opposite the wick, the base being engaged with the lamp body to define a receiving cavity therebetween, the base having a first through-hole; and a power driver board, disposed within the receiving cavity and electrically coupled to the wick, the power driver board being electrically coupled to a charging port, wherein the charging port is aligned with the first through-hole for connecting with an external power source;

wherein a groove is formed on one of a wall of the receiving cavity and the base, and a corresponding latching tab is formed on the other of the wall of the receiving cavity and the base, the latching tab engaging the groove to longitudinally secure the base to the lamp body.

2. The candle lamp according to claim 1, wherein the latching tab and the groove each extend in the form of a ring along a circumferential direction that is perpendicular to the longitudinal direction.

3. The candle lamp according to claim 2, wherein the base is configured to rotate synchronously with the latching tab, allowing the latching tab to rotate relative to the lamp body within the groove along the circumferential direction.

4. The candle lamp according to claim 2, wherein the latching tab is circumferentially discontinuous, being divided into a plurality of circumferentially spaced, arc-shaped latching segments; wherein the arc-shaped latching segments are configured to deform radially inward toward a center of the base in response to radial pressure during engagement with the groove.

5. The candle lamp according to claim 2, wherein the latching tab comprises a plurality of latching tabs spaced apart along the longitudinal direction; and the groove comprises a plurality of grooves spaced apart along the longitudinal direction, wherein the latching tabs correspond one-to-one with the grooves.

6. The candle lamp according to claim 5, wherein for any two adjacent latching tabs along the longitudinal direction, a radial dimension of the latching tab closer to the wick is smaller than a radial dimension of the latching tab farther from the wick; and wherein for any two adjacent grooves along the longitudinal direction, a radial dimension of the groove closer to the wick is smaller than a radial dimension of the groove farther from the wick.

7. The candle lamp according to claim 6, wherein for a corresponding pair of the latching tab and the groove, at least one of a pair of contacting surfaces of the latching tab and the groove during engagement is a sloped surface or a curved surface, thereby guiding the other surface to move along the sloped or curved surface and effecting the engagement of the latching tab and the groove.

8. The candle lamp according to claim 2, wherein the lamp body is provided with a tapered groove located on a side of the groove farther from the wick and spaced apart from the groove; the tapered groove has a first end and a second end opposite each other along the longitudinal direction of the lamp body, wherein the second end is closer to the groove, and a radial dimension of the first end is greater than a radial dimension of the second end; wherein when the base closes the receiving cavity, the latching tab moves along a wall of the tapered groove, guiding the base into the receiving cavity.

9. The candle lamp according to claim 8, wherein the tapered groove is circumferentially continuous, thereby allowing the latching tab to engage with the tapered groove from any orientation.

10. The candle lamp according to claim 1, further comprising a control assembly, the control assembly comprising a control main body and a switch; wherein the control main body is disposed within the receiving cavity and is connected to the power driver board; the switch is connected to the control main body and is movable relative thereto to switch between an ON state and an OFF state; wherein in the ON state, the power driver board is electrically connected to the wick, and the wick is in a light-emitting state; and in the OFF state, the power driver board is electrically disconnected from the wick, and the wick is in a de-energized state; wherein the base further comprises a second through-hole extending along the longitudinal direction of the candle lamp and spaced apart from the first through-hole, wherein the switch passes through the second through-hole, such that a portion thereof is exposed outside the receiving cavity for manual operation.

11. The candle lamp according to claim 1, wherein the latching tab is elastically deformable, such that when the base closes the receiving cavity, the latching tab is configured to be compressed and deformed between the lamp body and the base, allowing the base to carry the latching tab to move relative to the lamp body and engage with the groove.

12. A candle lamp, comprising:

a lamp body;

a wick, disposed at a first end of the lamp body along a longitudinal direction thereof, the wick being configured to emit light; and a base assembly, comprising a base and a power driver board, the power driver board being fixedly connected to the base, and the power driver board being further electrically coupled to the wick; wherein the power driver board is configured to move synchronously with the base to engage the base assembly with a second end of the lamp body along the longitudinal direction thereof opposite the wick, thereby positioning the power driver board within a receiving cavity defined by the base and the lamp body;

wherein the power driver board is provided with a latching slot, and the base is provided with a latching hook, the latching hook being engaged with and fixed to the latching slot.

13. The candle lamp according to claim 12, wherein the power driver board extends vertically along the longitudinal direction, and a thickness direction of the power driver board is perpendicular to the longitudinal direction; and the latching hook extends along the longitudinal direction, the latching slot being formed on an edge of the power driver board.

14. The candle lamp according to claim 13, wherein a quantity of the latching hooks and a quantity of the latching slots are each at least two and correspond one-to-one; two of the latching hooks are disposed diametrically opposite each other on the base, and two of the latching slots are disposed on opposite ends of the power driver board, wherein the direction of opposition of the two latching slots is perpendicular to both the longitudinal direction and the thickness direction of the power driver board.

15. The candle lamp according to claim 13, wherein the base is provided with a guide groove; during a process of fixing the power driver board to the base, a side edge of the power driver board is configured to slide along the guide groove vertically toward the base, to align the latching hook with the latching slot, thereby allowing the latching hook to be inserted into the latching slot.

16. The candle lamp according to claim 15, wherein a quantity of the guide grooves is two, the two guide grooves being disposed along the direction of opposition of the two latching slots, wherein the side edges of the power driver board are simultaneously disposed within the two guide grooves, thereby circumferentially constraining the power driver board within the guide grooves.

17. The candle lamp according to claim 15, wherein the latching hook has a first surface and the power driver board has a second surface, at least one of the first surface and the second surface being a sloped surface, a normal vector of the sloped surface being inclined with respect to the longitudinal direction of the lamp body; during the process of fixing the power driver board to the base, the second surface is configured to slide along the first surface, allowing the power driver board to move relative to the base, thereby effecting the engagement of the latching hook and the latching slot.

18. The candle lamp according to claim 17, wherein the latching hook is elastically deformable, such that when detaching the power driver board from the base, the latching hook is configured to elastically deform away from a side where the latching slot is located, allowing the latching hook to disengage from the latching slot, thereby enabling the power driver board to be detached from the base.

* * * * *